(12) United States Patent
Pillis et al.

(10) Patent No.: US 12,018,689 B2
(45) Date of Patent: Jun. 25, 2024

(54) DAMPING SYSTEM FOR COMPRESSOR

(71) Applicant: Johnson Controls Tyco IP Holdings LLP, Milwaukee, WI (US)

(72) Inventors: Joseph Woodrow Pillis, Hagerstown, MD (US); Holger Tychsen, Waynesboro, PA (US); Richard Witten Armentrout, Delmont, PA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/924,629

(22) PCT Filed: May 12, 2021

(86) PCT No.: PCT/US2021/032031
§ 371 (c)(1),
(2) Date: Nov. 10, 2022

(87) PCT Pub. No.: WO2021/231600
PCT Pub. Date: Nov. 18, 2021

(65) Prior Publication Data
US 2023/0175511 A1 Jun. 8, 2023

Related U.S. Application Data

(60) Provisional application No. 63/024,334, filed on May 13, 2020.

(51) Int. Cl.
*F04C 29/02* (2006.01)
*F04C 18/16* (2006.01)
(Continued)

(52) U.S. Cl.
CPC ............ *F04C 29/028* (2013.01); *F04C 18/16* (2013.01); *F04C 27/009* (2013.01);
(Continued)

(58) Field of Classification Search
CPC ...... F04C 29/028; F04C 18/16; F04C 27/009; F04C 29/025; F04C 29/026; F16F 15/0237
See application file for complete search history.

(56) References Cited

U.S. PATENT DOCUMENTS 5,244,285 A * 9/1993 Hagstedt ................. F16C 27/02
384/129
9,856,876 B2 1/2018 Pillis et al.
(Continued)

FOREIGN PATENT DOCUMENTS

| JP | S5227943 A | 3/1977 |
| JP | 2007126993 A | 5/2007 |
| WO | 2012071563 A1 | 5/2012 |

OTHER PUBLICATIONS

International Search Report and Written Opinion for PCT Application No. PCT/US2021/032031, dated Sep. 2, 2021, 12 pages.
(Continued)

*Primary Examiner* — Shafiq Mian
(74) *Attorney, Agent, or Firm* — Fletcher Yoder, P.C.

(57) ABSTRACT

A squeeze film damper assembly for a compressor includes a damper sleeve configured to be disposed about a rotor shaft of the compressor. The damper sleeve includes a pressure dam pocket formed in an inner circumference of the damper sleeve. The pressure dam pocket is configured to receive a flow of lubricant and to pressurize the flow of lubricant via rotation of the rotor shaft. The damper sleeve includes an outlet passage extending from the pressure dam pocket to an outer circumference of the damper sleeve. The squeeze film damper assembly also includes a bearing housing disposed about the damper sleeve to form a damper gap extending between the outer circumference of the damper sleeve and the bearing housing. The damper gap is fluidly coupled to
(Continued)

the outlet passage and is configured to receive the flow of lubricant from the pressure dam pocket.

20 Claims, 7 Drawing Sheets

(51) Int. Cl.
*F04C 27/00* (2006.01)
*F16F 15/023* (2006.01)

(52) U.S. Cl.
CPC ........ *F04C 29/025* (2013.01); *F16F 15/0237* (2013.01); *F04C 29/026* (2013.01)

(56) References Cited

U.S. PATENT DOCUMENTS

| | | | | |
|---|---|---|---|---|
| 2008/0085207 A1* | 4/2008 | Mosemann | ............. | F01C 21/02 |
| | | | | 418/201.2 |
| 2010/0037462 A1* | 2/2010 | Pettinato | ............. | F16F 15/0237 |
| | | | | 29/898.04 |
| 2019/0360524 A1* | 11/2019 | Ellwood, III | ......... | F01D 25/164 |

OTHER PUBLICATIONS

Japanese Office Action for JP Application No. 2022-568812, dated Oct. 20, 2023, 6 pages.

* cited by examiner

DAMPING SYSTEM FOR COMPRESSOR

CROSS-REFERENCE TO RELATED APPLICATIONS

This application is a U.S. National Stage Application of PCT International Application No. PCT/US2021/032031, entitled "DAMPING SYSTEM FOR COMPRESSOR," filed May 12, 2021, which claims priority to and the benefit of U.S. Provisional Application No. 63/024,334, entitled "DAMPING SYSTEM FOR COMPRESSOR," filed May 13, 2020, each of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Heating, ventilation, air conditioning, and/or refrigeration (HVAC&R) systems typically maintain temperature control in a structure or other controlled space by circulating a fluid (e.g., refrigerant) through a circuit via a compressor to exchange thermal energy with one or more additional fluids (e.g., water and/or air). One type of compressor that may be utilized in the HVAC&R system is a screw compressor, which generally includes one or more cylindrical rotors mounted inside a hollow casing. Twin screw compressor rotors typically have helically extending lobes (or flutes) and grooves (or flanks) on their outer radial surfaces that form threads extending about a circumference of the rotors. During operation, the threads of the rotors mesh together, with the lobes on one rotor meshing with the corresponding grooves on the other rotor to form a series of gaps between the rotors. The gaps cooperatively form a compression chamber that communicates with a compressor inlet or port and continuously reduces a volume of the fluid as the rotors turn to compress the fluid. In this manner, the compressor may direct fluid from the compressor inlet to a compressor outlet. In some cases, rotation of the rotors may generate vibrations that propagate through a housing of the compressor during compressor operation.

SUMMARY

In some embodiments, a squeeze film damper assembly for a compressor includes a damper sleeve configured to be disposed about a rotor shaft of the compressor. The damper sleeve includes a pressure dam pocket formed in an inner circumference of the damper sleeve, where the pressure dam pocket is configured to receive a flow of lubricant and to pressurize the flow of lubricant via rotation of the rotor shaft. The damper sleeve includes an outlet passage extending from the pressure dam pocket to an outer circumference of the damper sleeve. The squeeze film damper assembly also includes a bearing housing that is disposed about the damper sleeve to form a damper gap extending between the outer circumference of the damper sleeve and the bearing housing. The damper gap is fluidly coupled to the outlet passage and is configured to receive the flow of lubricant from the pressure dam pocket.

In some embodiments, a compressor includes a shaft configured to rotate about an axis and a damper sleeve disposed about the shaft. The damper sleeve includes a pressure dam pocket formed in an inner diameter of the damper sleeve and an outlet passage fluidly coupled to the pressure dam pocket. The outlet passage extends from the pressure dam pocket to an outer diameter of the damper sleeve. The pressure dam pocket is configured to receive a lubricant from a lubricant supply of the compressor. The shaft, when rotating about the axis, is configured to pressurize the lubricant within the pressure dam pocket to generate a pressurized lubricant. The compressor also includes a bearing housing disposed about the damper sleeve to form a damper gap extending between the damper sleeve and the bearing housing. The damper gap is fluidly coupled to the outlet passage and is configured to receive the pressurized lubricant from the outlet passage.

In some embodiments, a screw compressor includes a rotor shaft configured to rotate about an axis and a damper sleeve disposed about the rotor shaft. The damper sleeve includes an inlet passage, an outlet passage, and a pressure dam pocket extending between the inlet passage and the outlet passage. The inlet passage is configured to receive a lubricant at a first pressure and to direct the lubricant into the pressure dam pocket. The rotor shaft and the pressure dam pocket are configured to cooperatively pressurize the lubricant within the pressure dam pocket, during rotation of the rotor shaft about the axis, to generate a pressurized lubricant having a second pressure greater than the first pressure. The screw compressor also includes a bearing housing disposed about damper sleeve to form a damper gap between the damper sleeve and the bearing housing. The damper gap is fluidly coupled to the outlet passage and the outlet passage is configured to direct the pressurized lubricant from the pressure dam pocket into the damper gap.

DRAWINGS

Figure 9:
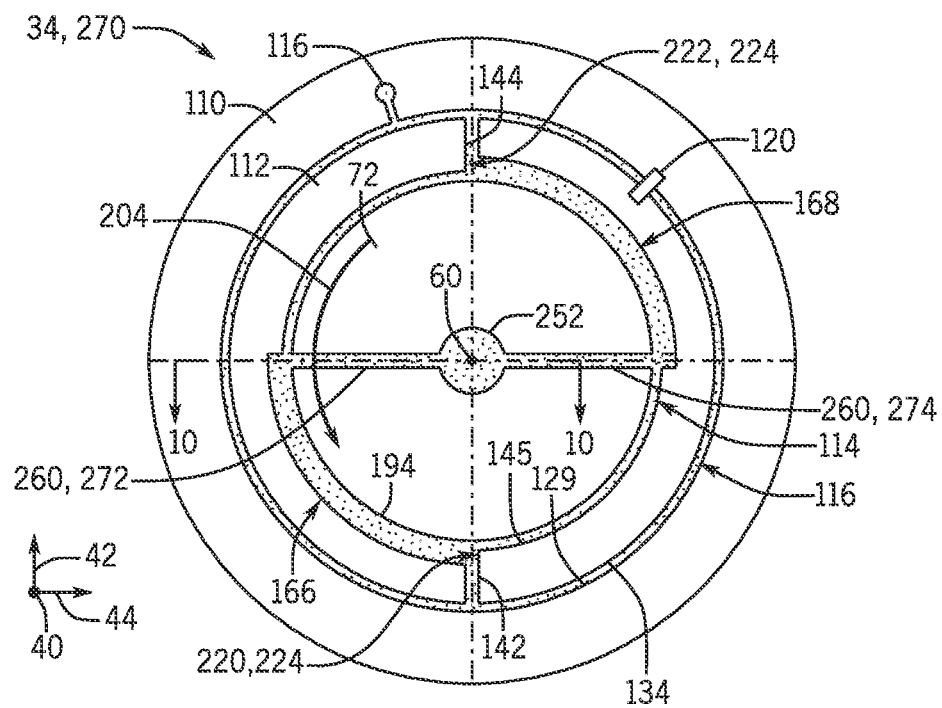
Figure 10:
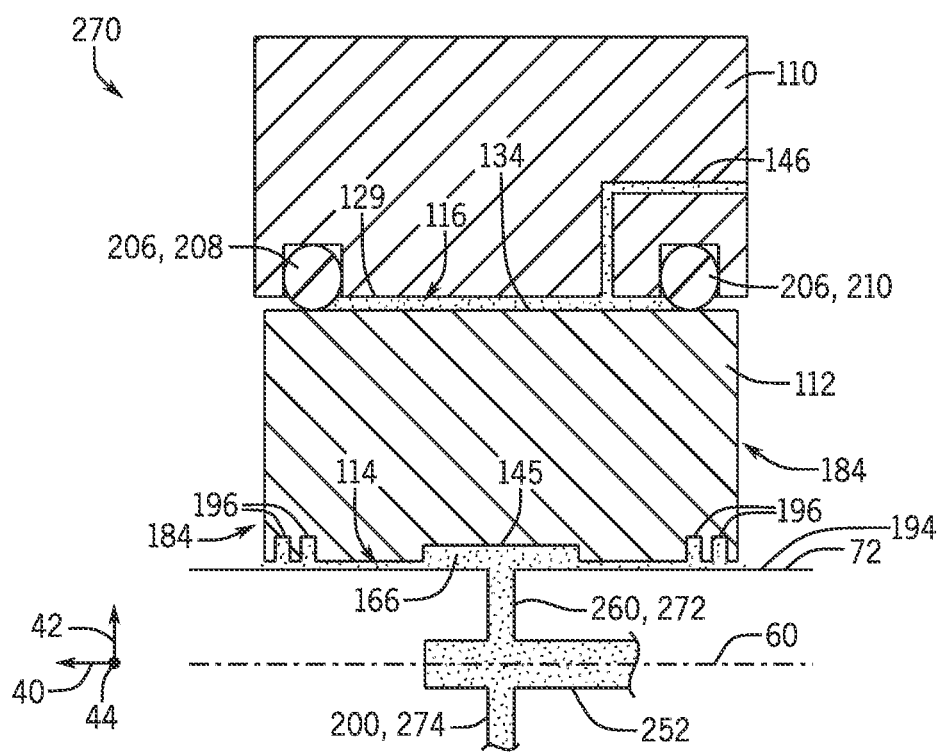

FIG. 9 is a cross-sectional axial view of an embodiment of a squeeze film damper assembly and a rotor shaft that may be used in a screw compressor of an HVAC&R system, in accordance with an aspect of the present disclosure; and FIG. 10 is a cross-sectional side view of an embodiment of a portion of a squeeze film damper assembly, taken within line 10-10 of FIG. 9, in accordance with an aspect of the present disclosure.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A heating, ventilation, air conditioning, and/or refrigeration (HVAC&R) system may include a vapor compression system having a compressor (e.g., a screw compressor) that is configured to circulate a fluid through piping or conduits of the vapor compression system. For example, the screw compressor may draw a relatively low pressure vapor flow (e.g., a flow of refrigerant) through a compressor inlet and discharge the vapor flow at a relatively high pressure through a compressor outlet. As such, the screw compressor facilitates fluid circulation through the vapor compression system.

Typically, screw compressors include one or more cylindrical rotors that are disposed within a hollow rotor housing or casing of the compressor. The rotors generally have helically extending lobes and grooves disposed on respective outer radial surfaces of the rotors that form threads extending about respective circumferences of the rotors. During compressor operation, the rotors mesh at an interface between the rotors to form a series of gaps extending between the lobes and the grooves of the rotors. The gaps cooperatively form a compression chamber that extends along a length of the rotor housing. The compression chamber is in fluid communication with a suction port (e.g., an axial or radial port near the compressor inlet) at one end of the rotor housing and a discharge port (e.g., an axial or radial port near the compressor outlet) at an opposite end of the rotor housing. When the rotors rotate, the gaps between the lobes and grooves may continuously decrease in volume from the suction port toward discharge port. In this manner, low pressure vapor entering the compressor inlet is compressed in the compression chamber and is discharged as high pressure vapor through the compressor outlet.

Each compressor rotor includes a rotor shaft that extends from opposing end portions of the rotor. Generally, one or more bearings (e.g., anti-friction bearings such as ball bearings, roller or rolling element bearings, and/or thrust bearings) engage the rotor shaft to rotatably couple the rotor to the rotor housing. As such, the bearings facilitate rotation of the rotor relative to the rotor housing. In some cases, rotation the rotors may generate vibrations (e.g. rotor vibrations) that occur as a result of high pressure fluid flow in the compression chamber and/or balance eccentricities that may be present in the rotors. Typical bearings have relatively low or negligible damping coefficients, such that rotor vibrations generated during compressor operation are transferred from the rotors, through the bearings, and into the rotor housing. The rotor vibrations may propagate from the rotor housing to other components of the compressor.

In some cases, transmission of excess rotor vibrations to certain compressor components may cause these components to incur mechanical wear and/or performance degradation over time. Accordingly, damping devices, such as squeeze film dampers, may be mounted between each rotor shaft and the rotor housing to attenuate rotor vibrations that may be generated during operation of the compressor. Squeeze film dampers typically include a damper sleeve that is disposed about a circumference of the rotor shaft. A layer of lubricant (e.g., an oil film) is disposed within a damper gap that extends between the damper sleeve and a damper housing of the squeeze film damper. A dedicated lubricant pump is used to pressurize the lubricant within the damper gap. During compressor operation, the pressurized lubricant within the damper gap may resist radial movement of the damper sleeve (e.g., relative to the damper housing) and, thus, enable the damper sleeve to apply a counter-force to the rotor shaft that attenuates vibrations (e.g., radial vibrations) of the rotor shaft. As such, squeeze film dampers may mitigate or substantially eliminate propagation of rotor vibrations from the rotors to the compressor housing. Unfortunately, utilizing lubricant pumps for pressurization of the lubricant within the damper gaps may be expensive and, thus, may increase overall manufacturing, maintenance, and/or operation costs of the screw compressor. Moreover, lubricant pumps may be susceptible to performance degradation that may cause the squeeze film dampers to operate less effectively over time.

It is now recognized that enabling squeeze film damper operation without utilization of dedicated lubricant pumps that supply pressurized lubricant to the squeeze film dampers may reduce overall manufacturing, maintenance, and/or operation costs of screw compressors and may improve compressor reliability. Accordingly, embodiments of the present disclosure are directed toward a squeeze film damper assembly that is configured to pressurize (e.g., self-pressurize) a lubricant received from a lubricant supply and to direct the pressurized lubricant into a damper gap of the squeeze film damper assembly. In this manner, the squeeze film damper assembly may operate to attenuate rotor vibrations of a screw compressor without utilization of a dedicated lubricant pump configured to pressurize the damper gap with lubricant. That is, the disclosed squeeze film damper assemblies may generate a sufficiently-pressurized supply of lubricant to avoid or mitigate bubble formation in the lubricant, thus enabling effective operation of the squeeze film damper, without utilization of external pumps or pressure generating devices. These and other features will be described below with reference to the drawings.

Figure 1:
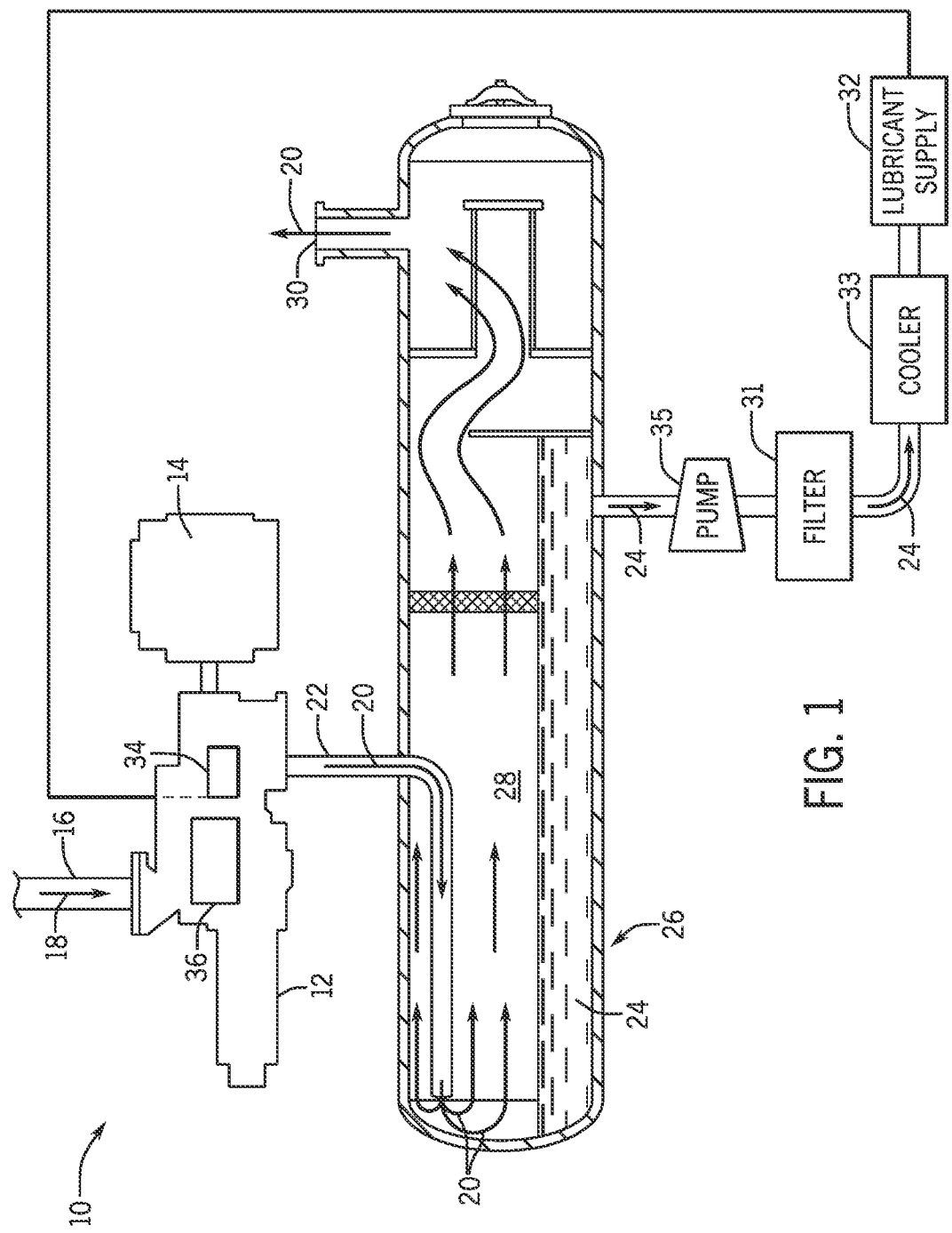
FIG. 1 is a schematic of an embodiment of a screw compressor package for a heating, ventilation, air conditioning, and/or refrigeration (HVAC&R) system, in accordance with an aspect of the present disclosure.

Turning now to the drawings, FIG. 1 is a schematic of an embodiment of a portion of a vapor compression system 10. The vapor compression system 10 includes a compressor 12 that, as discussed above, may circulate a flow of fluid (e.g., refrigerant, another suitable gas) through various circuits or conduits of the vapor compression system 10. A motor 14 may be integrated with or otherwise coupled to the compressor 12 and used to drive operation of the compressor 12. The compressor 12 may receive a flow of low pressure refrigerant or gas 18 via an intake conduit 16 and may discharge a flow of pressurized refrigerant or gas 20 via a discharge conduit 22. In some embodiments, a portion of a lubricant 24 used to facilitate compressor 12 operation may be mixed with the pressurized refrigerant 20 that is discharged from the compressor 12. Therefore, the vapor compression system 10 may include an oil separator 26 that is configured to separate the lubricant 24 from the flow of pressurized refrigerant 20. The oil separator 26 enables the lubricant 24 to separate from the pressurized refrigerant 20 (e.g., gas) and to coalesce within a collection chamber 28 of the oil separator 26, while enabling the pressurized refrigerant 20 to discharge via a discharge port 30. As such, the pressurized refrigerant 20 may flow from the discharge port 30 to remaining portions of the vapor compression system 10.

In some embodiments, the lubricant 24 separated from the pressurized refrigerant 20 within the collection chamber 28 may drain toward a lubricant supply 32 that supplies the compressor 12 with the lubricant 24. As such, the lubricant 24 collected within the collection chamber 28 may be directed back toward the compressor 12 for re-use after it is filtered and/or cooled. For example, in some embodiments, the vapor compression system 10 may include a filter 31 (e.g., an oil filter) and a lubricant cooler 33 that are fluidly coupled between the oil separator 26 and the lubricant supply 32. The filter 31 is configured to filter contaminants from the flow of lubricant 24. The lubricant cooler 33 is configured to reduce a temperature of the lubricant 24. In some embodiments, a pump 35 may be fluidly coupled between the oil separator 26 and the filter 31 and configured to direct the lubricant 24 from the collection chamber 28 to the filter 31. The compressor 12 may include a shaft seal and one or more bearings and squeeze film damper assemblies 34 that are configured to receive at least a portion of the lubricant 24 from the lubricant supply 32. As discussed in detail below, the squeeze film dampers assemblies 34 are configured to pressurize the lubricant 24 received form the lubricant supply 32 (e.g., without utilization of a dedicated lubricant pump) to enable attenuation of vibrations (e.g., rotor vibrations) that may be generated during rotation of one or more rotors 36 of the compressor 12.

Figure 2:
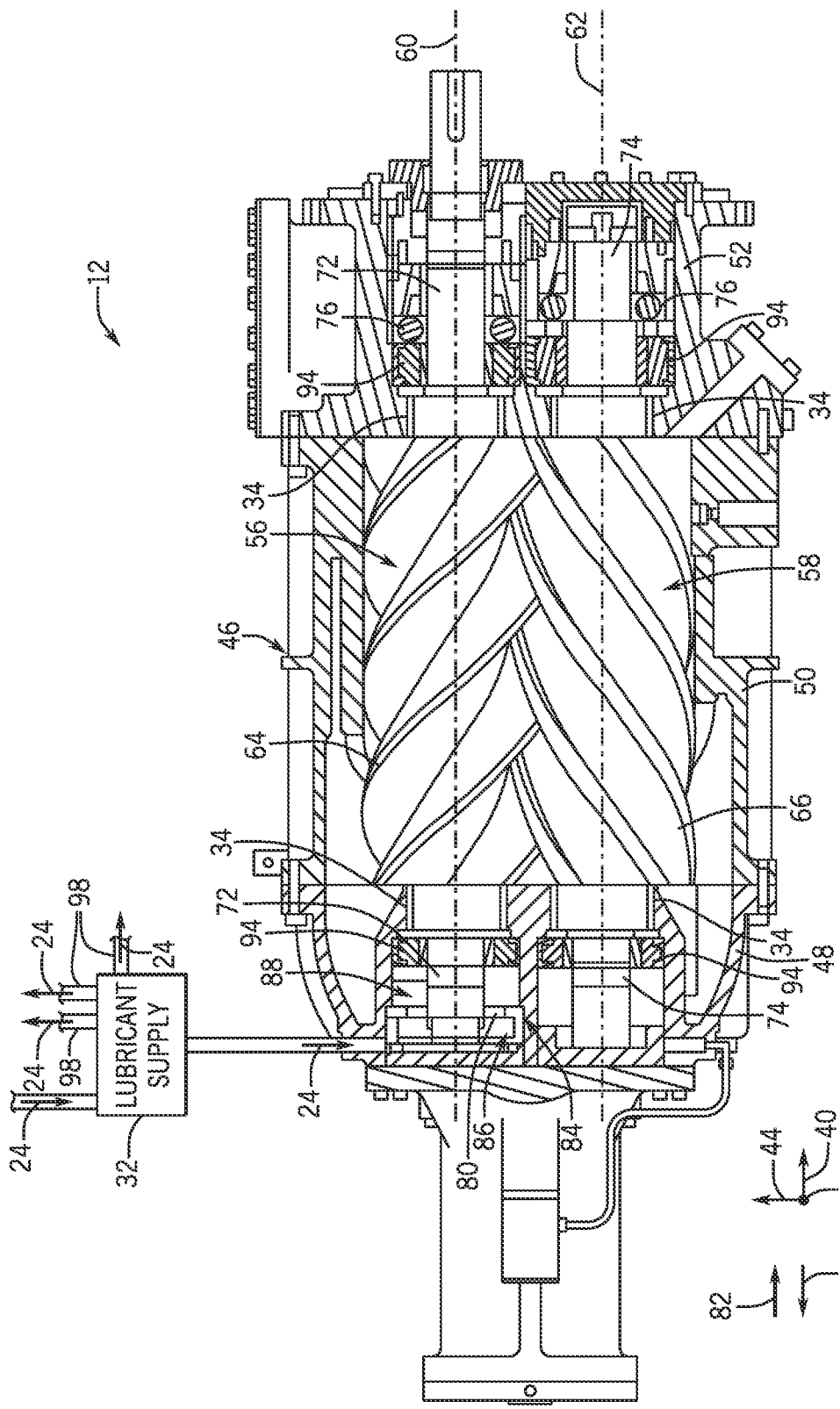
FIG. 2 is a cross-sectional plan view of an embodiment of a screw compressor that may be utilized in an HVAC&R system, in accordance with an aspect of the present disclosure.

FIG. 2 illustrates a cross-sectional view of an embodiment of the compressor 12. To facilitate discussion, the compressor 12 and its components may be described with reference to a longitudinal axis 40, a vertical axis 42, and a lateral axis 44. It should be noted that the vertical axis 42 and the lateral axis 44 extend in radial directions relative to the longitudinal axis 40. The compressor 12 includes a compressor housing 46 that contains working components (e.g., bearings, rotors) of the compressor 12. The compressor housing 46 may include an intake portion 48 (e.g., a suction side portion), a rotor housing 50 (e.g., a compression portion), and a discharge portion 52 (e.g., a discharge side portion).

In the illustrated embodiment, the compressor 12 includes a male rotor 56 and a female rotor 58 that are disposed within the rotor housing 50 and are configured to rotate about a first axis 60 and a second axis 62, respectively. The male rotor 56 and the female rotor 58 each extend from at least the intake portion 48 to the discharge portion 52 in a direction substantially parallel to the longitudinal axis 40, such that the first axis 60 and the second axis 62 also extend parallel to the longitudinal axis 40. The male rotor 56 includes one or more protruding lobes 64 disposed circumferentially about the male rotor 56. Similarly, the female rotor 58 includes one or more corresponding grooves 66 disposed circumferentially about the female rotor 58. The grooves 66 of the female rotor 58 are configured to receive and/or engage with the lobes 64 of the male rotor 56.

The intake portion 48 includes an intake port configured to receive a fluid (e.g., the low pressure refrigerant or gas 18) from a fluid circuit of the vapor compression system 10. Particularly, the fluid may be drawn into the intake port and directed toward the rotors 56, 58 disposed within the rotor housing 50. The lobes 64 of the male rotor 56 may mesh with the corresponding grooves 66 on the female rotor 58 to form a series of gaps between the rotors 56, 58. The gaps may cooperate to continuously compress the fluid received by the compressor 12 and may direct the compressed fluid toward a discharge port formed within the discharge portion 52. For example, during compressor 12 operation, the gaps may continuously reduce in volume (e.g., along the longitudinal axis 40) as the rotors 56, 58 rotate about the first and second axes 60, 62 to compress the fluid along the length of the rotors 56, 58 from the intake portion 48 to the discharge portion 52. Thereafter, the compressed fluid may subsequently flow out of the compressor 12 via the discharge port of the discharge portion 52.

During operation of the compressor 12, an axial force 70 may be imposed on a male rotor shaft 72 of the male rotor 56 and/or on a female rotor shaft 74 of the female rotor 58. In some embodiments, the axial force 70 may be transmitted to one or more bearings, such as thrust bearings 76, which are radially disposed about the male rotor shaft 72 and/or the female rotor shaft 74. While the illustrated embodiment of FIG. 2 shows the compressor 12 having one thrust bearing 76 associated with the male rotor shaft 72 and one thrust bearing 76 associated with the female rotor shaft 74, it should be noted that the compressor 12 may include two, three, four, five, six, or more than six thrust bearings 76 disposed about (e.g., adjacent to one another) one or both of the male and female rotor shafts 72, 74.

In certain embodiments, a force application device, such as a balance piston 80 (e.g., a balance piston assembly), may be disposed within a portion of the compressor housing 46 (e.g., the intake portion 48) and configured to impose a regulating force 82 (e.g., a counter-force) on the male rotor shaft 72, the female rotor shaft 74, or both. As such, the balance piston 80 may reduce a magnitude of the axial force 70 applied to the thrust bearings 76. For example, the balance piston 80 may be disposed within a chamber 84 of the intake portion 48 and may divide the chamber 84 into a first chamber 86 and a second chamber 88. In some embodiments, the first chamber 86 may be configured to receive a pressurized flow of the lubricant 24 (e.g., from the pump 35), and the lubricant 24 within the first chamber 86 may enable the balance piston 80 to generate and apply the regulating force 82 to the male rotor shaft 72. As discussed below, in some cases, a portion of the pressurized lubricant 24 within the first chamber 86 may flow past the balance piston 80 (e.g., via a weep hole of the balance piston 80). As a result, the lubricant 24 may flow into the second chamber 88 and/or toward other components of the compressor 12.

As shown in the illustrated embodiment, the compressor 12 may also include a plurality of bearings 94 (e.g., antifriction bearings) that are configured to support the male and female rotors 56, 58. Particularly, a first set of the bearings 94 may be disposed about and configured to support the male rotor shaft 72 of the male rotor 56, and a second set of the bearings 94 may be disposed about and configured to support the female rotor shaft 74 of the female rotor 58. The bearings 94 enable more efficient rotation of the male and female rotors 56, 58 about the first and second axes 60, 62. In some embodiments, a plurality of conduits 98 (e.g., channels or passageways within the compressor housing 46, external pipes) may extend from the lubricant supply 32 to enable lubricant 24 flow toward and/or within the compressor 12. In this way, lubricant 24 maybe supplied to the bearings 94, the thrust bearings 76, the rotors 56, 58, and/or various other compressor components.

As mentioned above, a damping coefficient of the bearings 94 may be relatively negligible, which may cause vibrations generated by the rotors 56, 58 during compressor 12 operation to be transferred from the rotors 56, 58, through the bearings 94, and to the compressor housing 46. Therefore, the compressor 12 may be equipped with the squeeze film damper assemblies 34, which are configured to attenuate vibrations generated by the rotors 56, 58 in order to reduce or substantially eliminate propagation of rotor vibrations to the compressor housing 46. In the illustrated embodiments, two squeeze film damper assemblies 34 are disposed about the male rotor shaft 72, and two squeeze film damper assemblies 34 are disposed about the female rotor shaft 74. It should be appreciated that, in other embodiments, any suitable quantity of squeeze film damper assemblies 34 may be disposed about the male and female rotor shafts 72, 74. Moreover, it should be understood that the squeeze film damper assemblies 34 may be located at any suitable position along the male and female rotor shafts 72, 74 and are not limited to the respective locations shown in the illustrated embodiment of FIG. 2.

Figure 3:
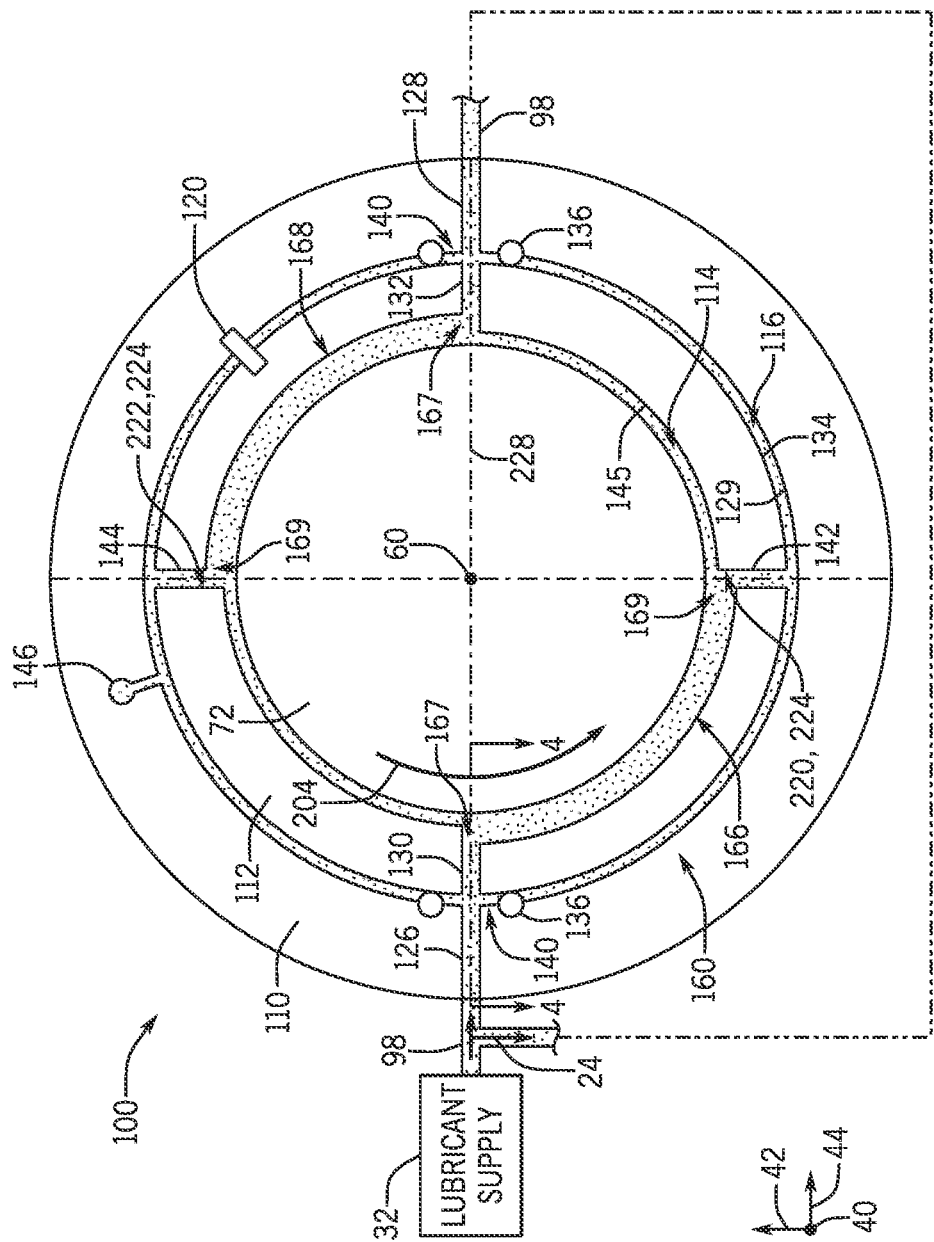
FIG. 3 is a cross-sectional axial view of an embodiment of a squeeze film damper assembly and a rotor shaft that may be used in a screw compressor of an HVAC&R system, in accordance with an aspect of the present disclosure.

To better illustrate the features of the squeeze film damper assemblies 34 and to facilitate the following discussion, FIG. 3 is a cross-sectional axial view of an embodiment of one of the squeeze film damper assemblies 34 of the male rotor 56, referred to herein as a squeeze film damper assembly 100. More specifically, the squeeze film damper assembly 100 may be disposed about the male rotor shaft 72, also referred to herein as the shaft 72. Although the squeeze film damper assembly 100 is described below as being implemented with the male rotor shaft 72, it should be understood that the squeeze film damper assembly 100 may be implemented with the female rotor shaft 74 or on any other suitable drive shaft or power transmission shaft.

In the illustrated embodiment of FIG. 3, the squeeze film damper assembly 100 includes a bearing housing 110 or damper housing that is disposed about a circumference of the shaft 72. The bearing housing 110 may include a metallic sleeve that is press-fit, threaded, or otherwise coupled to a portion of the compressor housing 46, such as the intake portion 48. In other embodiments, the bearing housing 110 may include a portion of the compressor housing 46. That is, the bearing housing 110 may include a portion of the compressor housing 46 that is machined or otherwise manufactured to include the features of the bearing housing 110 discussed herein. One or more features of the bearing housing 110 may be integrally formed with the compressor housing 46, for example.

A damper sleeve 112 (e.g., a hydrodynamic bearing) is positioned between the bearing housing 110 and the shaft 72 and extends about a circumference of the shaft 72. The damper sleeve 112 forms a first gap, referred to herein as a bearing gap 114, which extends between the damper sleeve 112 and the shaft 72, and a second gap, referred to herein as a damper gap 116, which extends between the damper sleeve 112 and the bearing housing 110. The damper sleeve 112 and the bearing housing 110 may each be positioned substantially concentrically about the first axis 60, such that the bearing gap 114 and the damper gap 116 extend axially along at least a portion of the first axis 60. In the illustrated embodiment, an anti-rotation pin 120 extends radially (e.g., relative to the first axis 60) between the bearing housing 110 and the damper sleeve 112. As discussed in detail below, the anti-rotation pin 120 may substantially block rotational motion of the damper sleeve 112 relative to the bearing housing 110, while enabling the damper sleeve 112 to move radially (e.g., relative to the first axis 60) relative to the bearing housing 110.

In the illustrated embodiment, the bearing housing 110 includes a first inlet passage 126 and a second inlet passage 128 that extend radially across a width of the bearing housing 110. As such, the first and second inlet passages 126, 128 may terminate at respective openings formed in an inner circumference 129 or diameter (e.g., an inner surface) of the bearing housing 110. The damper sleeve 112 includes a first inlet channel 130 and a second inlet channel 132 that each extend from an outer circumference 134 or diameter (e.g., an outer surface) of the damper sleeve 112 to the bearing gap 114. The first and second inlet passages 126, 128 are fluidly coupled to the first and second inlet channels 130, 132. Flow of lubricant 24 from the first and second inlet passages 126, 128 to the first and second inlet channels 130, 132, respectively, is further facilitated by a set of seals 136 (e.g., "O"-rings). Specifically, the seals 136 may be positioned about respective openings of the first inlet passage 126, the second inlet passage 128, the first inlet channel 130, and the second inlet channel 132, and may extend between the bearing housing 110 and the damper sleeve 112. In this manner, the seals 136 may isolate (e.g., fluidly seal) respective portions of the damper gap 116 extending between the inlet passages 126, 128 and the inlet channels 130, 132, referred to herein as transfer passages 140, from a remaining portion of the damper gap 116. As such, the seals 136 may facilitate fluid flow from the first and second inlet passages 126, 128, through the first and second inlet channels 130, 132, and into the bearing gap 114, while blocking substantial fluid flow directly from the first and second inlet passages 126, 128 into the damper gap 116.

As shown in the illustrated embodiment, the damper sleeve 112 includes a first outlet channel 142 or passage and a second outlet channel 144 or passage that extend radially (e.g., relative to the first axis 60) from the bearing gap 114 to the damper gap 116. Specifically, the first and second outlet channels 142, 144 may extend from an inner circumference 145 or diameter (e.g., an inner surface) of the damper sleeve 112 to the outer circumference 134 or diameter (e.g., an outer surface) of the damper sleeve 112. As such, the first and second outlet channels 142, 144 fluidly couple the damper gap 116 to the bearing gap 114. An outlet port 146 is formed within the bearing housing 110 and, as discussed below, fluidly couples the damper gap 116 to another region of the compressor 12. The first and second inlet passages 126, 128, the first and second inlet channels 130, 132, the bearing gap 114, the first and second outlet channels 142, 144, the damper gap 116, and the outlet port 146 may collectively form a lubricant circuit 160 that enables circulation of lubricant through the squeeze film damper assembly 100.

For example, as shown in the illustrated embodiment, the first and second inlet passages 126, 128 may be fluidly coupled to the lubricant supply 32 via the conduits 98. As such, the first and second inlet passages 126, 128 may receive a flow of lubricant 24 from the lubricant supply 32 and may direct the lubricant 24 into the transfer passages 140. The transfer passages 140 direct the lubricant 24 through the first and second inlet channels 130, 132 and into the bearing gap 114. The lubricant 24 may subsequently flow from the bearing gap 114, through the first and second outlet channels 142, 144, through the damper gap 116, and into the outlet port 146. The outlet port 146 may be fluidly coupled to the lubricant supply 32 in order to circulate used lubricant from the damper gap 116 back toward the lubricant supply 32 for reuse in the compressor 12.

Although the first and second inlet passages 126, 128 are shown as fluidly coupled directly to the lubricant supply 32 in the illustrated embodiment of FIG. 3, it should be appreciated that, in other embodiments, the first and second inlet passages 126, 128 may be fluidly coupled to any other suitable region or component of the compressor 12 or vapor compression system 10 in order to receive a flow of lubricant 24 from another region or component. For example, in some embodiments, the first and second inlet passages 126, 128 may be fluidly coupled to the first chamber 86 of the balance piston 80, the second chamber 88 of the balance piston 80, or both. Accordingly, in such embodiments, the first and second inlet passages 126, 128 may be configured to receive lubricant 24 from the first and/or second chambers 86, 88 of the balance piston 80, instead of the conduits 98.

Figure 4:
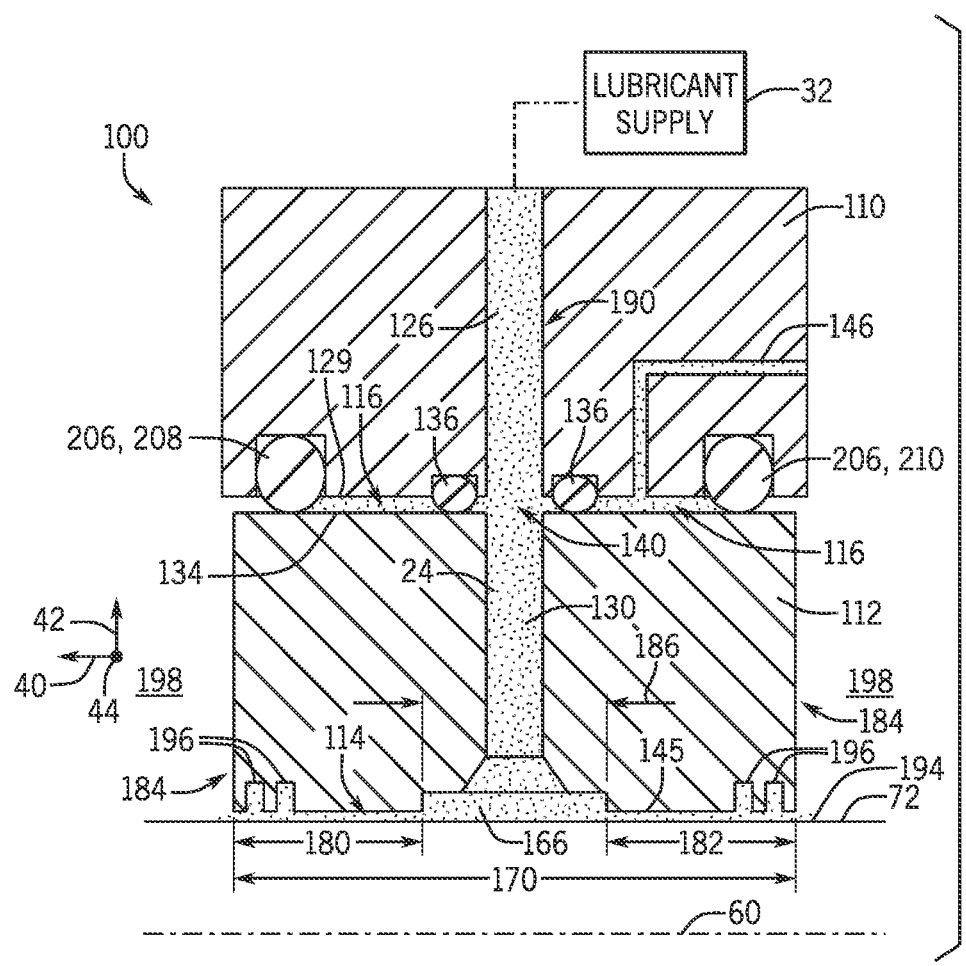
FIG. 4 is a cross-sectional side view of an embodiment of a portion of a squeeze film damper assembly, taken within line 4-4 of FIG. 3, in accordance with an aspect of the present disclosure.

In the illustrated embodiment, the damper sleeve 112 includes a first pressure dam pocket 166 that extends between the first inlet channel 130 and the first outlet channel 142 and a second pressure dam pocket 168 that extends between the second inlet channel 132 and the second outlet channel 144. The first and second inlet channels 130, 132 may be positioned at or near respective first end portions 167 of the first and second pressure dam pockets 166, 168 and the first and second outlet channels 142, 144 may be positioned at or near respective second end portions 169 of the first and second pressure dam pockets 166, 168. The first and second pressure dam pockets 166, 168 may be formed via grooves, channels, or arcuate slots that are formed within the damper sleeve 112 and extend (e.g., circumferentially extend) along at least a portion of the inner circumference 145 or diameter of the damper sleeve 112. Moreover, the first and second pressure dam pockets 166, 168 may extend along a section of an axial length 170 (e.g., as shown in FIG. 4) of the damper sleeve 112. As discussed in detail below, during compressor 12 operation, the first and second pressure dam pockets 166, 168 enable pressurization of the lubricant 24 received from the lubricant supply 32 via rotation of the shaft 72, thereby facilitating lubricant 24 flow into the damper gap 116. In this way, a layer of pressurized lubricant 24 surrounding the damper sleeve 112 is formed within the damper gap 116.

To better illustrate one of the pressure dam pockets 166, 168 (e.g., the first pressure dam pocket 166) and to facilitate the following discussion, FIG. 4 is a partial cross-sectional view of an embodiment of the squeeze film damper assembly 100, taken within line 4-4 of FIG. 3. For clarity, it should be noted that, in the illustrated embodiment of FIG. 4, the outlet port 146 is positioned at a different location in the bearing housing 110 than in the illustrated embodiment of FIG. 3. Moreover, although the first pressure dam pocket 166 is primarily discussed below, it should be appreciated that the second pressure dam pocket 168 may include some of or all of the features of the first pressure dam pocket 166 discussed herein.

With the foregoing in mind, as shown in the illustrated embodiment of FIG. 4, the bearing gap 114 may include a first portion 180 and a second portion 182 that extend from respective end portions 184 (e.g., axial end portions) of the damper sleeve 112 to the first pressure dam pocket 166. Thus, the first pressure dam pocket 166 defines a third portion 186 of the bearing gap 114 that extends between the first and second portions 180, 182 of the damper gap 116. In some embodiments, radial dimensions of the first and second portions 180, 182 of the bearing gap 114 may be relatively small, as compared to a radial dimension of the first pressure dam pocket 166 (e.g., along the third portion 186 of the bearing gap 114). As described herein, a radial dimension may refer to a radial distance between an outer circumference 194 or diameter of the shaft 72 and the inner circumference 145 or diameter of the damper sleeve 112. For example, in some embodiments, the radial dimensions of the first and second portions 180, 182 of the bearing gap 114 may be approximately five thousandths of an inch. The radial dimension of the first pressure dam pocket 166 of the bearing gap 114 may be double, triple, or more than triple the radial dimension of the first and second portions 180, 182. Thus, the radial dimension of the bearing gap 114 varies between the end portions 184 of the damper sleeve 112 (e.g., along the first axis 60).

In the illustrated embodiment, the first pressure dam pocket 166 is fluidly coupled to the lubricant supply 32 via a lubricant supply passage 190, which is generally defined by the first inlet passage 126, the transfer passage 140, and the first inlet channel 130. The lubricant supply passage 190 enables flow of lubricant 24 from the lubricant supply 32 into the bearing gap 114, such that the lubricant 24 may flow toward and physically contact an outer surface of the shaft 72. In some embodiments, one or more bearing seals 196 may be located near the end portions 184 of the damper sleeve 112 and configured to inhibit or substantially block lubricant 24 flow from the bearing gap 114 into an environment 198 surrounding or external to the squeeze film damper assembly 100, such as a portion of the compressor housing 46.

For example, the bearing seals 196 may include labyrinth seals or other suitable seals that may extend from the inner circumference 145 of the damper sleeve 112 toward the outer circumference 194 of the shaft 72. Accordingly, the bearing seals 196 may mitigate or substantially reduce lubricant leakage between the damper sleeve 112 and the shaft 72 near the end portions 184 of the damper sleeve 112. That is, the bearing seals 196 may ensure that substantially all lubricant entering the bearing gap 114 from the lubricant supply passage 190 is directed through the first and second outlet channels 142, 144 (see, e.g., FIG. 3) and into the damper gap 116.

Figure 5:
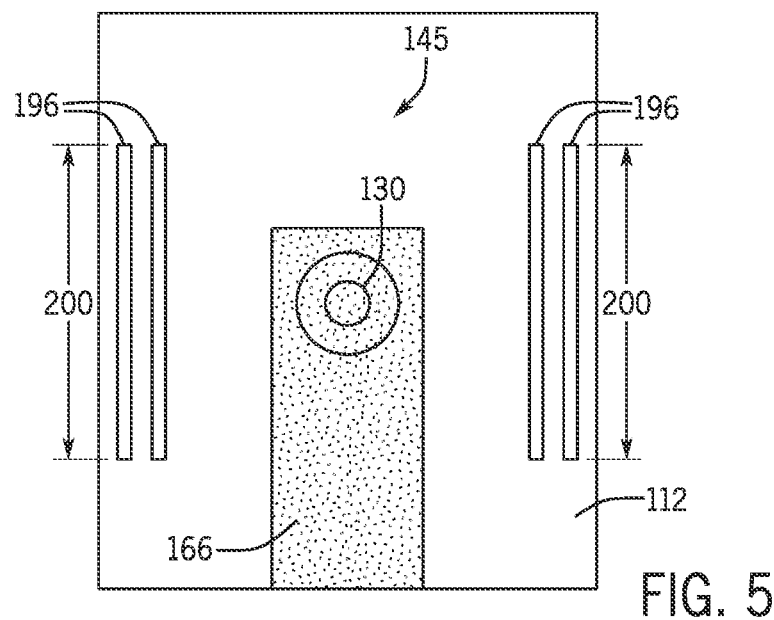
FIG. 5 is a schematic of an embodiment of a portion of a damper sleeve that may be included in a squeeze film damper assembly of a screw compressor, in accordance with an aspect of the present disclosure.

In certain embodiments, the bearings seals 196 may extend about only a portion of the inner circumference 145 of the damper sleeve 112. For example, as shown in the illustrated embodiment of FIG. 5, the bearing seals 196 may extend along (e.g., axially along) a particular section 200 of the inner circumference 145 of the damper sleeve 112 that is proximate to an outlet of the first inlet channel 130. In other embodiments, some of or all of the bearing seals 196 may be omitted from the squeeze film damper assembly 100, such that a portion of the lubricant 24 entering the bearing gap 114 may weep from the bearing gap 114 into the surrounding environment 198. For example, in such embodiments, lubricant 24 weeping from the bearing gap 114 may be directed toward components adjacent to the squeeze film damper assembly 100 (e.g., in an installed configuration within the compressor 12), such as one of the bearings 94.

The following discussion continues with reference to FIG. 4. As discussed in detail below, during rotation of the shaft 72 about the first axis 60, viscous shearing forces between an outer surface of the shaft 72 and the lubricant 24 within the first pressure dam pocket 166 enable a discharge of pressurized lubricant 24 from the first outlet channel 142 (FIG. 3) and into the damper gap 116. The squeeze film damper assembly 100 may therefore include a plurality of circumferential seals 206 that are configured to fluidly seal the damper gap 116 from the surrounding environment 198 to block or substantially mitigate leakage of pressurized lubricant 24 from the damper gap 116 and into the surrounding environment 198. For example, the squeeze film damper assembly 100 may include a first circumferential seal 208 and a second circumferential seal 210 that are disposed about the outer circumference 134 of the damper sleeve 112 and extend (e.g., radially extend) between the bearing housing 110 and the damper sleeve 112. As such, the first and second circumferential seals 208, 210 facilitate formation of fluidic seals that fluidly isolate the damper gap 116 from the surrounding environment 198.

As discussed above, the seals 136 are configured to block fluid flow directly from the transfer passage 140 to the damper gap 116, and vice versa. As such, the seals 136 may inhibit flow of high-pressure lubricant from the damper gap 116 into the lubricant supply passage 190. In other words, the seals 136 enable low pressure lubricant to flow from the lubricant supply 32, though the transfer passage 140, and into the bearing gap 114, while high pressure lubricant within the damper gap 116 is blocked from flowing into the transfer passage 140. The outlet port 146 may enable at least a portion of the pressurized lubricant 24 to discharge from the damper gap 116 and flow toward another suitable component of the compressor 12, such as the bearings 94, the lubricant supply 32, or other compressor component.

The following discussion continues with reference to FIG. 3. As noted above, the bearings 94 are configured to support the shaft 72 and to guide rotation of the shaft 72 about the first axis 60. In some embodiments, tolerances between the bearings 94 and the shaft 72 may enable the shaft 72 to vibrate or oscillate in radial directions (e.g., with respect to the first axis 60) during operation of the compressor 12. Because a radial dimension of the bearing gap 114 (e.g., at least along the first and second portions 180, 182 of the bearing gap 114) is relatively small (e.g., less that five thousandths of an inch), the damper sleeve 112 may move radially with the shaft 72 during such vibrational or oscillatory motion of the shaft 72. In other words, because an overall radial dimension of the bearing gap 114 is relatively small and filled with a film or layer of lubricant 24, relative radial movement between the shaft 72 and the damper sleeve 112 is substantially negligible. Thus, when the shaft 72 vibrates radially (e.g., with respect to the first axis 60), the shaft 72 and the damper sleeve 112 may collectively move relative to the bearing housing 110.

A radial dimension of the damper gap 116 may be relatively large, as compared to the overall or average radial dimension of the bearing gap 114 (e.g., at least along the first and second portions 180, 182 of the bearing gap 114). As a non-limiting example, the damper gap 116 may include a radial dimension extending radially between the damper sleeve 112 and the bearing housing 110 that is double, triple, or more than triple an overall or average radial dimension of the bearing gap 114. Thus, during vibrational and/or oscillatory radial movement of the shaft 72, the damper sleeve 112 may move radially within the bearing housing 110 to cyclically increase and decrease a radial dimension of the damper gap 116 along various sections of the damper gap 116. The pressurized lubricant 24 within the damper gap 116 may apply a counter-force to the damper sleeve 112 that resists such radial movement of the damper sleeve 112 within the bearing housing 110. Thus, the pressurized lubricant 24 within the damper gap 116 enables the damper sleeve 112 to apply a force on the shaft 72 that may attenuate an amplitude of radial vibration of the shaft 72.

In some embodiments, the lubricant 24 discharged from the oil separator 26 may have absorbed refrigerant or other gas due to the temperature and/or pressure in the oil separator 26. The absorbed gas (e.g., refrigerant) may come out of solution and form bubbles in the lubricant 24 when a pressure of the lubricant 24 is lowered below a threshold pressure value (e.g., a pressure value below a pressure within the oil separator 26). As discussed below, by pressurizing the lubricant 24 in the squeeze film damper assembly 100 to a pressure that exceeds a pressure at which the gas went into solution (e.g., in the oil separator 26), bubble formation in the lubricant 24 may be reduced or substantially eliminated. The squeeze film damper assembly 100 is configured to self-pressurize the lubricant 24 received from the oil separator 26 and, thus, ensure that the lubricant 24 within the damper gap 116 is substantially bubble-free. The bubble-free lubricant 24 enables the squeeze film (e.g., the lubricant 24 layer in the damper gap 116) to effectively dampen compressor shaft vibrations that may occur during compressor operation.

It should be appreciated that the radial dimension of the damper gap 116 may be sized such that, even if the shaft 72 oscillates across an upper threshold amount of the radial shaft 72 movement permitted by the bearings 94, the damper sleeve 112 does not mechanically contact the bearing housing 110. In this way, the damper gap 116 may ensure that the bearings 94 support substantially all of the radial load of the male rotor 56 during operation of the compressor 12 and do not transfer the radial load of the male rotor 56 to the components of the squeeze film damper assembly 100.

As noted above, the squeeze film damper assembly 100 may be configured to self-pressurize the damper gap 116 with lubricant 24 without utilization of a dedicated lubricant pump. Therefore, the squeeze film damper assembly 100 may operate to attenuate compressor 12 shaft vibrations in accordance with the techniques discussed above without utilization of a dedicated lubricant pump that is configured to facilitate and maintain a supply of pressurized lubricant within the damper gap 116.

For example, in the illustrated embodiment of FIG. 3, the shaft 72 is configured to rotate in a counterclockwise direction 204 about the first axis 60 during compressor 12 operation. As noted above, the anti-rotation pin 120 may inhibit rotational motion of the damper sleeve 112 (e.g., about the first axis 60) that otherwise may be induced via rotation of the shaft 72. As such, the anti-rotation pin 120 may ensure that the first and second inlet channels 130, 132 of the damper sleeve 112 remain circumferentially and radially aligned with the first and second inlet passages 126, 128 of the bearing housing 110 during operation of the squeeze film damper assembly 100. That is, the anti-rotation pin 120 may ensure that the damper sleeve 112 remains rotationally stationary, with respect to the bearing housing 110, while the shaft 72 may rotate (e.g., about the first axis 60) relative to the bearing housing 110 and the damper sleeve 112. It should be appreciated that the seals 136 may account for slight radial movement of the damper sleeve 112 relative to the bearing housing 110 while still maintaining a fluid seal between the damper sleeve 112 and the bearing housing 110.

As discussed above, lubricant 24 entering the first and second pressure dam pockets 166, 168 (e.g., via the corresponding inlet channels 130, 132) may physically contact an outer surface of the shaft 72. Rotation of the shaft 72 about the first axis 60 (e.g., in the counterclockwise direction 204) generates viscous shearing forces between the outer surface of the shaft 72 and the lubricant 24 within the pressure dam pockets 166, 168 that are sufficient to force the lubricant 24 along the pressure dam pockets 166, 168 in a direction of rotation of the shaft 72. That is, the viscous shearing forces between the shaft 72 and the lubricant 24 enable the shaft 72 to force lubricant 24 along the first and second pressure dam pockets 166, 168 in the counterclockwise direction 204, thereby drawing additional lubricant 24 into the first and second pressure dam pockets 166, 168 via the first and second inlet channels 130, 132. The shaft 72 may continuously force (e.g., via viscous shearing) lubricant 24 along the first and second pressure dam pockets 166, 168 (e.g., in the counterclockwise direction 204) and direct the lubricant 24 onto respective impingement surfaces 220, 222 of the pressure dam pockets 166, 168. The impingement surfaces 220, 222 may be walls 224 of the damper sleeve 112 that define portions of the first and second outlet channels 142, 144. The walls 224 may extend generally radially relative to the first axis 60, such that the walls 224 abruptly terminate a profile (e.g., an arcuate profile) of the pressure dam pockets 166, 168. As the lubricant 24 abruptly impinges on the ends of the pressure dam pockets 166, 168, a higher pressure is developed, thereby enabling the lubricant 24 to discharge from the pressure dam pockets 166, 168 at a greater pressure than a pressure at which the lubricant 24 enters the pressure dam pockets 166, 168.

Because the overall or average radial dimension of the damper gap 116 may be relatively small, as compared to a radial dimension of the damper gap 116 along the pressure dam pockets 166, 168, substantially all of the lubricant 24 sheared or otherwise forced by the shaft 72 along the pressure dam pockets 166, 168 (e.g., in the counterclockwise direction 204) may impinge upon the impingement surfaces 220, 222 and stagnate near the outlet channels 142, 144, while a small portion of the lubricant 24 may bypass the outlet channels 142, 144 and continue to flow along the bearing gap 114 (e.g., in the counterclockwise direction 204). Stagnation of the lubricant 24 near the outlet channels 142, 144, combined with the continuous lubricant 24 shearing of the shaft 72, pressurizes the lubricant 24 within the pressure dam pockets 166, 168, particularly near the outlet channels 142, 144. Accordingly, the outlet channels 142, 144 may discharge pressurized lubricant 24 into the damper gap 116 at a pressure that is greater than a pressure at which the lubricant 24 is received by the bearing gap 114 at the inlet channels 130, 132. As a non-limiting example, the viscous shearing between the lubricant 24 and the shaft 72 may enable the outlet channels 142, 144 to discharge pressurized lubricant 24 at a discharge pressure that is 5 pounds per square inch (psi), 10 psi, 20 psi, 30 psi, 40 psi, 50 psi, 60 psi, 70 psi, or more than 70 psi greater than an intake pressure at which the lubricant 24 enters the bearing gap 114 via the inlet channels 130, 132. As such, the squeeze film damper assembly 100 may self-pressurize the damper gap 116 with lubricant 24 without utilization of an external lubricant pump. That is, the squeeze film damper assembly 100 may receive lubricant 24 at a first pressure from, for example, the lubricant supply 32, and may pressurize the lubricant 24 within the damper gap 116 to second pressure that is greater than the first pressure.

Although the squeeze film damper assembly 100 includes two pressure dam pockets 166, 168 in the illustrated embodiment of FIG. 3, it should be appreciated that the squeeze film damper assembly 100 may include any other suitable quantity of pressure dam pockets. For example, the squeeze film damper assembly 100 may include 1, 2, 3, 4, or more than four pressure dam pockets that are formed within the damper sleeve 112 and are arrayed about a circumference of the shaft 72. Further, it should be understood that an arc length of the pressure dam pockets 166, 168 (e.g., an arcuate dimension between the respective inlet channels 130, 132 and the respective outlet channels 142, 144) may include any suitable dimension and is not limited to the dimension shown in the illustrated embodiment of FIG. 3. For example, each of the pressure dam pockets 166, 168 may extend about approximately 20 percent, approximately 30 percent, approximately 40 percent, or more than 40 percent of the outer circumference 194 of the shaft 72.

In some embodiments, radial dimensions of the first and second pressure dam pockets 166, 168 may be substantially constant along a circumference of the shaft 72. In other embodiments, the radial dimensions of the first and second pressure dam pockets 166, 168 may vary along the circumference of the shaft 72. For example, in such embodiments, radial dimensions of the first and second pressure dam pockets 166, 168 near the inlet channels 130, 132 may be greater than or less than radial dimensions of the pressure dam pockets 166, 168 near the outlet channels 142, 144.

The outlet port 146 is configured to receive a portion of the pressurized lubricant 24 from the damper gap 116 and to discharge the pressurized lubricant 24 from the damper gap 116. Particularly, the outlet port 146 may direct the pressurized lubricant 24 back toward the lubricant supply 32, toward an oil cooler, or toward another suitable component or region of the compressor 12 or vapor compression system 10. In this way, the outlet port 146 may enable a continuous flow of lubricant through the damper gap 116, such that used lubricant 24 (e.g., heated lubricant) may be replaced with fresh, cooler pressurized lubricant 24 received from the outlet channels 142, 144 in order to avoid excessive heating of the lubricant 24 in the damper gap 116 that may permit bubble formation within the lubricant 24.

It should be appreciated that a cross-sectional area of the outlet port 146 may be less than a cumulative cross-sectional area of the first and second outlet channels 142, 144. As such, the outlet port 146 may be configured to discharge lubricant 24 at an egress rate that is less than an ingress rate at which lubricant 24 may be supplied to the damper gap 116 via the first and second outlet channels 142, 144. Accordingly, the outlet port 146 may ensure that a flow of pressurized lubricant 24 generated via rotation of the shaft 72 is sufficient to enable and maintain lubricant 24 pressurization within the damper gap 116. In some embodiments, the outlet port 146 may be positioned near an upper portion (with respect to a direction of gravity) of the bearing housing 110. As used herein, the upper portion of the bearing housing 110 may be indicative of any portion of the bearing housing 110 that is above, with respect to a direction of gravity, a lateral centerline 228 of the squeeze film damper assembly 100 that extends through the first axis 60 and is oriented generally parallel to the lateral axis 44. Accordingly, the outlet port 146 may receive and discharge gases (e.g., gas or refrigerant bubbles) that may accumulate within the lubricant 24 during operation of the squeeze film damper assembly 100 and aggregate near an upper portion of the damper gap 116.

Figure 6:
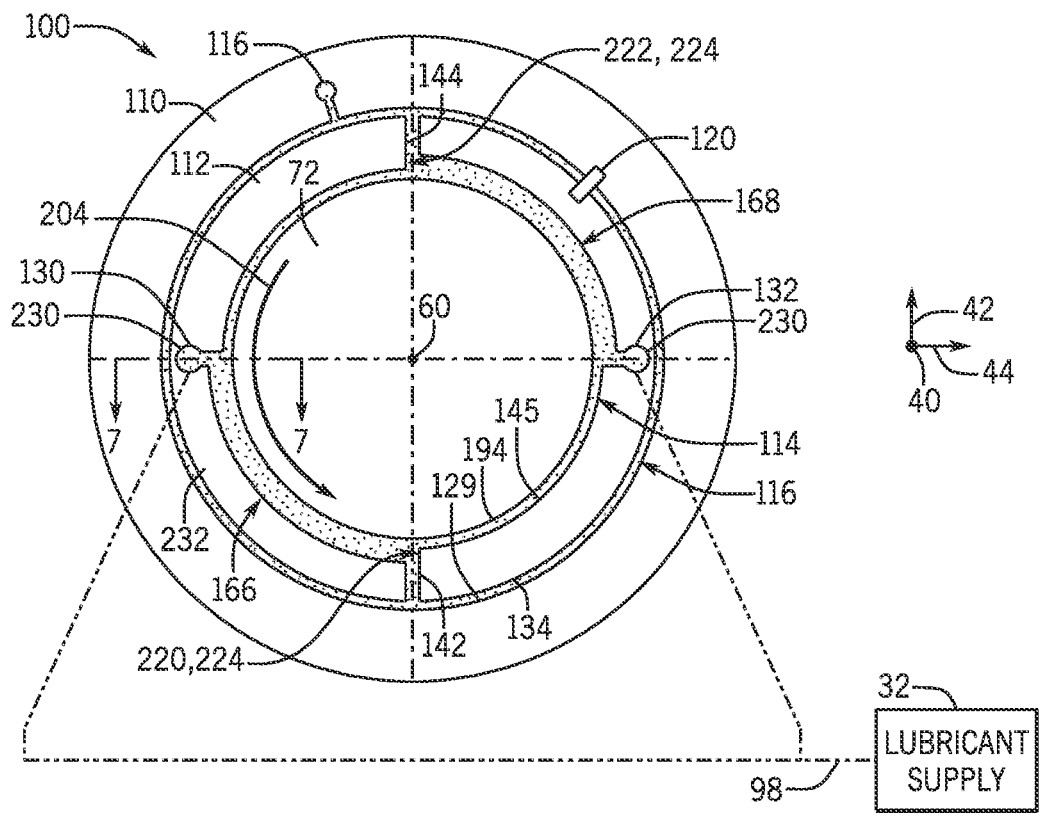
FIG. 6 is a cross-sectional axial view of an embodiment of a squeeze film damper assembly and a rotor shaft that may be used in a screw compressor of an HVAC&R system, in accordance with an aspect of the present disclosure.
Figure 7:
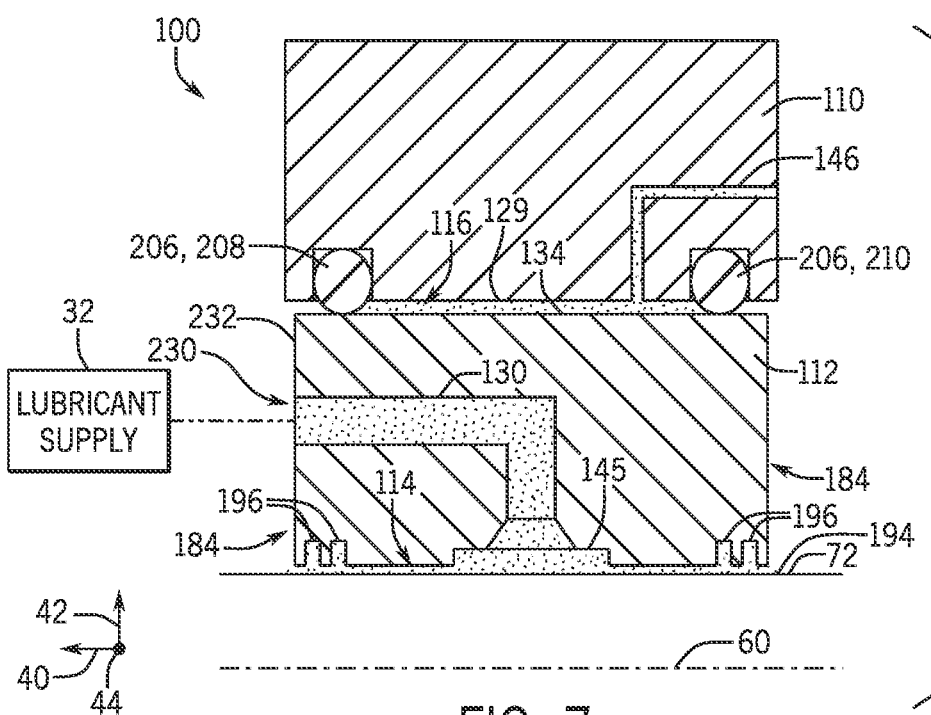
FIG. 7 is a cross-sectional side view of an embodiment of a portion of a squeeze film damper assembly, taken within line 7-7 of FIG. 6, in accordance with an aspect of the present disclosure.

FIG. 6 is a cross-sectional axial view of another embodiment of the squeeze film damper assembly 100 and the shaft 72, in which the first and second inlet channels 130, 132 are configured to receive lubricant 24 in an axial direction (e.g., along the first axis 60), instead of a radial direction (e.g., along the lateral axis 44). FIG. 7 is cross-sectional view of the squeeze film damper assembly 100 and the shaft 72, taken within line 7-7 of FIG. 6. For clarity, it should be noted that, in the illustrated embodiment of FIG. 7, the outlet port 146 is positioned at a different location in the bearing housing 110 than in the illustrated embodiment of FIG. 6. FIGS. 6 and 7 will be discussed concurrently below.

In some embodiments, the first and second inlet channels 130, 132 may include axial openings 230 that are formed on an axial surface 232 or axial end face of the damper sleeve 112 and are fluidly coupled to the lubricant supply 32 or to another suitable lubricant source. As such, the first and second inlet channels 130, 132 may receive a flow of lubricant 24 at the axial openings 230 and direct the lubricant 24 toward the first and second pressure dam pockets 166, 168. By enabling lubricant 24 to enter the first and second inlet channels 130, 132 in an axial direction (e.g., along the first axis 60), the first inlet passage 126, the second inlet passage 128, and seals 136 may be omitted from the squeeze film damper assembly 100.

Figure 8:
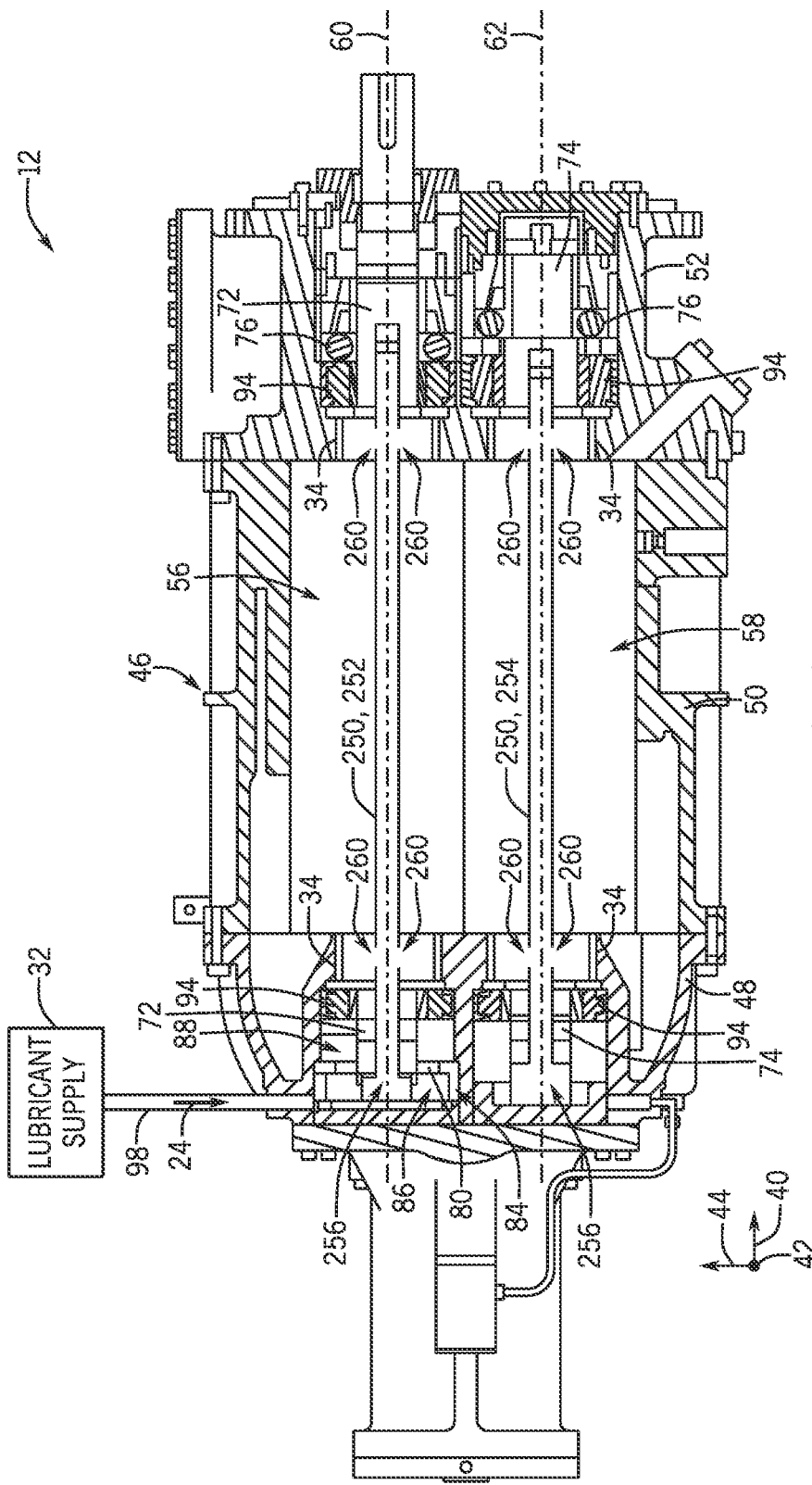
FIG. 8 is a cross-sectional plan view of an embodiment of a screw compressor that may be utilized in an HVAC&R system, in accordance with an aspect of the present disclosure.

FIG. 8. Is a cross-sectional view of an embodiment of the compressor 12, in which the male rotor shaft 72 and the female rotor shaft 74 include internal lubricant passageways 250 configured to supply the squeeze film damper assemblies 34 with lubricant 24. For example, the male rotor shaft 72 includes a first lubricant passageway 252 that extends through a body of the male rotor shaft 72 (e.g., along the first axis 60), from the intake portion 48 to the discharge portion 52 of the compressor housing 46. Similarly, the female rotor shaft 74 includes a second lubricant passageway 254 that extends through a body of the female rotor shaft 74 (e.g., along the second axis 62), from the intake portion 48 to the discharge portion 52 of the compressor housing 46. The first and second passageways 252, 254 may include axial openings 256 that are formed in respective end portions of the male and female rotor shafts 72, 74 and are configured to receive a flow of the lubricant 24. For example, the axial openings 256 may be fluidly coupled to the lubricant supply 32, to the first or second chambers 86, 88 of the balance piston 80, or to another suitable lubricant source of the compressor 12 that is configured to supply the first and second passageways 252, 254 with lubricant 24. As discussed below, a plurality of radial passages 260 may be formed within the male and female rotor shafts 72, 74 and be configured to direct lubricant 24 from the first and second passageways 252, 254 to the squeeze film damper assemblies 34.

To better illustrate the features of the squeeze film damper assemblies 34 of FIG. 8 and to facilitate the following discussion, FIG. 9 is a cross-sectional axial view of an embodiment of one of the squeeze film damper assemblies 34 of the male rotor 56, referred to herein as a squeeze film damper assembly 270, and of the male rotor shaft 72. It should be understood that the female rotor shaft 74 and squeeze film damper assembly 34 corresponding to the female rotor shaft 74 may include some of or all of the features of the squeeze film damper assembly 270 and the male rotor shaft 72 discussed below.

As shown in the illustrated embodiment of FIG. 9, the shaft 72 includes a first radial passage 272 and a second radial passage 274 that extend radially outward from the first passageway 252. The first and second radial passages 272, 274 are configured to direct lubricant 24 into the bearing gap 114, such that the lubricant 24 may fill the bearing gap 114 and surround the shaft 72. In accordance with the techniques discussed above, the shaft 72 may, via rotation about the first axis 60, pressurize lubricant 24 with the first and second pressure dam pockets 166, 168 and force the pressurized lubricant 24 into the damper gap 116 via the first and second outlet channels 142, 144. As such, the squeeze film damper assembly 270 may operate to attenuate vibrations of the shaft 72 that may occur during compressor 12 operation. Although the shaft 72 includes two radial passages 272, 274 in the illustrated embodiment of FIG. 8, it should be understood that, in other embodiments, the shaft 72 may include any suitable quantity of radial passages.

FIG. 10 is cross-sectional view of the squeeze film damper assembly 270 and the shaft 72, taken within line 10-10 of FIG. 9. In the illustrated embodiment of FIG. 10, the outlet port 146 is positioned at a different location in the bearing housing 110 than in the illustrated embodiment of FIG. 9. It should be appreciated that, by enabling supply of lubricant 24 through the shaft 72, the first and second inlet passages 126, 128, the seals 136, and the first and second inlet channels 130, 132 may be omitted from the squeeze film damper assembly 270. Particularly, by enabling supply of lubricant through the shaft 72, the first and second inlet channels 130, 132 may be omitted from the damper sleeve 112. Thus, the damper sleeve 112 does not include inlet passages (e.g., one or both of the inlet channels 130, 132) for directing lubricant through the damper sleeve 112 and into the first and second pressure dam pockets 166, 168.

In certain embodiments, the squeeze film damper assemblies 100 of FIGS. 3 and 6 may be disposed about the shaft 72 of FIG. 9, in lieu of the squeeze film damper assembly 270. As such, it should be understood that the squeeze film damper assemblies 34 may receive lubricant 24 from a combination of lubricant sources and are not limited to the embodiments illustrated and described herein. That is, it should be appreciated that the embodiments of the squeeze film damper assemblies 34, 100, 270 discussed herein are not mutually exclusive.

As set forth above, embodiments of the present disclosure may provide one or more technical effects useful for enabling operation of a squeeze film damper without utilization of a dedicated lubricant pump configured to supply pressurized lubricant to the squeeze film damper. Particularly, embodiments of the squeeze film damper assembly discussed herein are configured to self-pressurize a lubricant received from a lubricant supply and direct the pressurized lubricant into damper gap of the squeeze film damper assembly. In this manner, the squeeze film damper assembly may operate to attenuate rotor vibrations of a screw compressor without utilization of a dedicated lubricant pump configured to pressurize the damper gap of the squeeze film damper assembly. As such, the squeeze film damper assembly may reduce overall manufacturing, maintenance, and/or operation costs of screw compressors and may further improve compressor reliability. It should be understood that the technical effects and technical problems in the specification are examples and are not limiting. Indeed, it should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A squeeze film damper assembly for a compressor, comprising:
   a damper sleeve configured to be disposed about a rotor shaft of the compressor and comprising:
      a pressure dam pocket formed into an inner circumference of the damper sleeve and configured to receive a flow of lubricant and pressurize the flow of lubricant via rotation of the rotor shaft; and
      an outlet passage extending from the pressure dam pocket to an outer circumference of the damper sleeve; and
   a bearing housing disposed about the damper sleeve to form a damper gap extending between the outer circumference of the damper sleeve and the bearing housing, wherein the damper gap is fluidly coupled to the outlet passage and is configured to receive the flow of lubricant from the pressure dam pocket.

2. The squeeze film damper assembly of claim 1, wherein the pressure dam pocket comprises an arcuate slot extending along at least a portion of the inner circumference of the damper sleeve.

3. The squeeze film damper assembly of claim 1, comprising an anti-rotation pin extending between the damper sleeve and the bearing housing, wherein the anti-rotation pin blocks rotational movement of the damper sleeve relative to the bearing housing and enables radial movement of the damper sleeve relative to the bearing housing.

4. The squeeze film damper assembly of claim 1, comprising:
   a first inlet passage formed in the bearing housing and extending to an inner circumference of the bearing housing; and
   a second inlet passage formed in the damper sleeve and extending from the outer circumference of the damper sleeve to the pressure dam pocket, wherein the first inlet passage is fluidly coupled to the second inlet passage to form a lubricant supply passage of the squeeze film damper assembly.

5. The squeeze film damper assembly of claim 4, wherein the lubricant supply passage is configured to receive the flow of lubricant from a lubricant supply of the compressor and direct the flow of lubricant toward the pressure dam pocket.

6. The squeeze film damper assembly of claim 1, comprising an inlet passage extending between the pressure dam pocket and an opening formed on an axial end face of the damper sleeve, wherein the inlet passage is configured to receive the flow of lubricant from a lubricant supply of the compressor and direct the flow of lubricant toward the pressure dam pocket.

7. The squeeze film damper assembly of claim 1, wherein the pressure dam pocket is configured to receive the flow of lubricant from a passage formed in a body of the rotor shaft of the compressor.

8. The squeeze film damper assembly of claim 1, comprising an outlet port formed in the bearing housing, wherein the outlet port is configured to receive at least a portion of the flow of lubricant from the damper gap and to discharge the portion of the flow of lubricant from the squeeze film damper assembly.

9. The squeeze film damper assembly of claim 8, wherein the outlet port is formed within a portion of the bearing housing above, relative to a direction of gravity, a lateral centerline of the squeeze film damper assembly.

10. A compressor, comprising:
    a shaft configured to rotate about an axis;
    a damper sleeve disposed about the shaft, wherein the damper sleeve comprises a pressure dam pocket formed into an inner diameter of the damper sleeve and an outlet passage fluidly coupled to the pressure dam pocket and extending from the pressure dam pocket to an outer diameter of the damper sleeve, wherein the pressure dam pocket is configured to receive a lubricant from a lubricant supply of the compressor, and wherein the shaft, when rotating about the axis, is configured to pressurize the lubricant within the pressure dam pocket to generate a pressurized lubricant; and
    a bearing housing disposed about the damper sleeve to form a damper gap extending between the damper sleeve and the bearing housing, wherein the damper gap is fluidly coupled to the outlet passage and is configured to receive the pressurized lubricant from the outlet passage.

11. The compressor of claim 10, wherein the pressure dam pocket comprises an arcuate slot extending along at least a portion of the inner diameter of the damper sleeve.

12. The compressor of claim 11, wherein the arcuate slot terminates at an impingement surface of the damper sleeve, wherein the impingement surface extends radially outward relative to the axis and forms a portion of the outlet passage.

13. The compressor of claim 10, wherein the outlet passage is fluidly coupled to a first end portion of the pressure dam pocket, wherein the damper sleeve comprises an inlet passage fluidly coupled to a second end portion of the pressure dam pocket, opposite the first end portion, and wherein the inlet passage is configured to direct the lubricant from the lubricant supply into the pressure dam pocket.

14. The compressor of claim 13, wherein the inlet passage comprises a first opening formed on the outer diameter of the damper sleeve, wherein the bearing housing comprises an additional inlet passage comprising a second opening formed on an inner diameter of the bearing housing, wherein the inlet passage and the additional inlet passage are fluidly coupled to one another, wherein the compressor comprises a seal disposed radially between the damper sleeve and the bearing housing and extending about the first opening and the second opening, and wherein the additional inlet passage is configured to direct the lubricant from the lubricant supply to the inlet passage.

15. The compressor of claim 13, wherein the inlet passage comprises an axial opening formed in an axial end face of the damper sleeve, wherein the axial opening is fluidly coupled to the lubricant supply to enable flow of the lubricant from the lubricant supply to the inlet passage.

16. The compressor of claim 13, comprising a balance piston assembly configured to apply an axial force on the shaft, wherein the inlet passage is fluidly coupled to the balance piston assembly and is configured to receive the lubricant from the balance piston assembly.

17. The compressor of claim 10, wherein the shaft comprises:
an internal passage extending along the axis and configured to receive the lubricant from the lubricant supply; and
a radial passage extending from the internal passage to an outer diameter of the shaft, wherein the internal passage and the pressure dam pocket are fluidly coupled to one another via the radial passage to enable flow of the lubricant from the internal passage into the pressure dam pocket.

18. A screw compressor, comprising:
a rotor shaft configured to rotate about an axis;
a damper sleeve disposed about the rotor shaft, wherein the damper sleeve comprises an inlet passage, an outlet passage, and a pressure dam pocket extending between the inlet passage and the outlet passage, wherein the inlet passage is configured to receive a lubricant at a first pressure and to direct the lubricant into the pressure dam pocket, and wherein the rotor shaft and the pressure dam pocket are configured to cooperatively pressurize the lubricant within the pressure dam pocket, during rotation of the rotor shaft about the axis, to generate a pressurized lubricant having a second pressure greater than the first pressure; and
a bearing housing disposed about damper sleeve to form a damper gap between the damper sleeve and the bearing housing, wherein the damper gap is fluidly coupled to the outlet passage, and the outlet passage is configured to direct the pressurized lubricant from the pressure dam pocket into the damper gap.

19. The screw compressor of claim 18, wherein the second pressure is 5 pounds per square inch (psi), 10 psi, 20 psi, 30 psi, 40 psi, 50 psi, or more than 50 psi greater than the first pressure.

20. The screw compressor of claim 18, comprising an anti-rotation pin extending between the damper sleeve and the bearing housing, wherein the anti-rotation pin is configured to block rotational movement of the damper sleeve about the axis and relative to the bearing housing and is configured to enable radial movement of the damper sleeve relative to the axis and relative to the bearing housing.

* * * * *